June 2, 1970   C. E. WYKES   3,515,013
RESILIENT CHAIN PROTECTOR
Filed Aug. 5, 1968
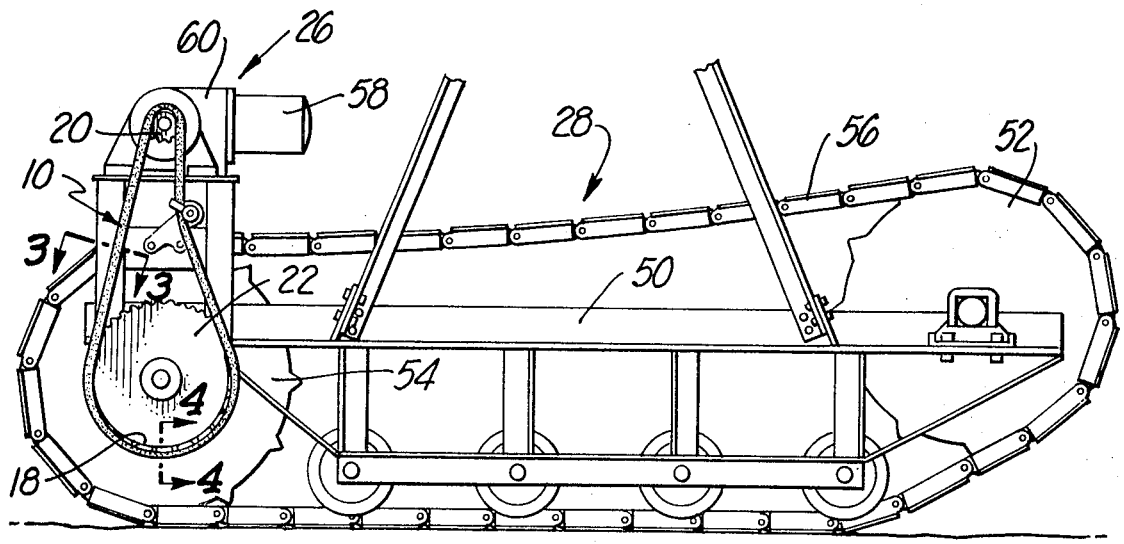
INVENTOR
CLAUDE E. WYKES
BY HIS ATTORNEYS
HARRIS, KIECH, RUSSELL & KERN 3,515,013
RESILIENT CHAIN PROTECTOR
Claude E. Wykes, Temple City, Calif., assignor to Layne & Bowler Pump Company, La Puente, Calif., a corporation of California
Filed Aug. 5, 1968, Ser. No. 750,091
Int. Cl. F16p 1/00
U.S. Cl. 74—611                                    6 Claims

ABSTRACT OF THE DISCLOSURE

A resilient, generally U-shaped, chain protector having an elongated body including a web portion with opposed flange portions extending from the sides thereof and means defining a longitudinal groove along the inside face of each of said flange portions adjacent said web portion, said grooves defining a shoulder on each of said flange portions for preventing lateral movement of said protector relative to the chain.

---

This invention relates to chain protectors and, more particularly, to a resilient chain protector or cover for use with a link chain or the like. Although the protector is principally intended for use with a link chain typically mounted between a number of sprockets, the protector may be used with various types or forms of chains or various other drive or linkage mechanisms and all such uses are intended to be within the scope of the invention.

Link chains or the like are in common use today in various drive or linkage mechanisms. Oftentimes the chain is exposed and preferably should be covered with a protector. The protector may serve a double function of protecting the chain from the elements as well as protecting a person or persons from the chain, as with the common bicycle chain. It can also serve as a reservoir for lubricants or be packed with a suitable grease to lubricate the chain and protect it from corrosion.

Various types and forms of chain protectors or covers are employed today; however, many problems still exist. For example, many chain covers are quite rigid and cannot be used with a link or roller chain which is mounted between sprockets of relatively small diameter. Additionally, where the chain is mounted between sprockets of small diameter, the flexible protectors or covers tend to move laterally at the sprocket and eventually come off the sprocket and the chain. Many protectors, also do not adequately cover the chain.

Accordingly, I have developed a novel resilient chain protector which may be inexpensively and easily manufactured and assembled and which alleviates the aforementioned problems. The resiliency of the protector enables it to be used with a chain mounted about sprockets of small diameter. My protector covers substantially the entire outer surface of the chain to be protected and additionally includes means for preventing lateral movement of the protector relative to the chain.

More particularly, my invention includes a resilient chain protector having a generally U-shaped cross section and including an elongated body member with a web portion and opposed flange portions extending from the sides of the web portion. The body is adapted to receive the chain where the web portion is positioned adjacent one outer face of the chain and the flange portions are adjacent the sides of the chain. Each flange portion may include a lip portion extending inwardly from the outer edge thereof where each lip portion is positionable adjacent the remaining face of the chain to provide substantially entire coverage for the outside of the chain.

Each flange portion includes in its inside face a longitudinally grooved portion adjacent the web portion, with the grooved portion defining a shoulder on the flange portion for preventing lateral movement of the body relative to the chain.

It is an object of my invention, therefore, to provide a resilient chain protector which is inexpensively and easily manufactured and assembled.

Another object of my invention is to provide such a protector which covers substantially all the exposed portion of the chain.

A further object is to provide such a protector including means for preventing lateral movement of the protector relative to the chain.

The invention, both as to its organization and method of operation, together with further objects and advantages thereof, may best be understood by reference to the following description taken in connection with the accompanying drawing.

In the drawing:

FIG. 1 is a side elevational view of my chain protector in actual use mounted about a chain of a drive mechanism;

FIG. 2 is an enlarged cross-sectional view of my chain protector in its natural state;

FIG. 3 is an enlarged cross-sectional view of my chain protector taken along the line 3—3 in FIG. 1; and FIG. 4 is an enlarged cross-sectional view of my chain protector taken along the line 4—4 in FIG. 1.

Referring now to the drawing, my chain protector, as indicated by the reference numeral 10, is preferably of a generally U-shaped cross section and includes an elongated body 12 having a web portion 14 and opposed flange portions 16 extending from each side of the web portion 14. The chain protector 10 is mountable about a link chain 18 or the like which typically may be connected between a number of sprockets, such as sprockets 20 and 22 in FIG. 1. The chain protector 10 includes means 24 for preventing lateral movement of the protector 10 relative to the chain 18.

More particularly, FIG. 1 shows my chain protector 10 mounted about a link chain 18 in actual operation with a drive mechanism 26 for a drive unit 28, for example, for a self-propelled sprinkling unit (not shown). The drive unit or carriage 28 includes a load carrying frame 50 to which a front track sprocket 52 and a rear track drive sprocket 54 are rotatably secured. An endless track 56 is positioned on the sprockets 52 and 54 and is driven thereby. The rear track sprocket 54 is driven in rotation by the drive mechanism 26 which includes a motor 58, a gear reduction unit 60, and the drive chain 18 and sprockets 20 and 22. The drive unit or carriage 28 transports the pipeline (not shown) for the sprinkling system. In such an operation, the chain 18 would be exposed constantly to the elements, including the water from the system, and would require some form of protection such as my protector 10 to prevent rust and debris from forming and collecting on the chain.

The chain protector 10 is mounted to the link chain 18, or the like, which is mounted between the sprockets 20 and 22. The chain protector 10 preferably is formed from a resilient material, such as neoprene, and may, for example, be manufactured by a typical extrusion process. The body of the protector is extruded in a continuous strip which may be cut into desired lengths. The two ends of each length may then be attached together by heat sealing, for example, to form a closed loop. Any other resilient protective material may be used for the protector and any other suitable manufacturing process may be employed as well within the scope of the invention.

The chain protector 10 is adapted to substantially cover the outer surface of the chain 18 to provide the most adequate protection. As shown in FIG. 3, the chain protector 10 is mountable about the chain 18 so that the web portion 14 is positioned adjacent an outer face 30 of the chain 18 and the flange portions 16 are positioned adjacent sides 32 and 34 of the chain 18. Preferably, each flange portion 16 includes a lip portion 36 extending inwardly from the outer edge 40 thereof. The lip portions 36 act to more completely retain and encircle the chain 18. As shown in FIG. 2, when the protector 10 is in its natural state, the flanges 16 are slightly bowed together so that the distance between flanges is less at or near the outer edges 40 than at or near the web 14. When, therefore, the protector 10 is mounted about the chain 18, the flanges are forced slightly outwardly and the resilience of the protector acts to clamp the body 12 to the chain as the flanges 16 tend to return to their original state.

As illustrated in FIGS. 1 and 4, as the chain 18 engages the sprockets 20 and 22, the flanges 16 of the protector 10 flare or deflect outwardly due to the difference in radius at the web 14 and at the edges 40 of the flanges 16. As the chain 18 and the protector 10 engage and move around with a sprocket, the radius of turn of the flanges 16, particularly at the edges 40, is much less than that for the web 14. The edges 40 of the flanges are compressed longitudinally and the flanges, therefore, are forced outwardly. The smaller the diameter of the sprocket, the greater will be the longitudinal compressive force exerted on the edges 40 of the flanges. When the flanges are thus deflected outwardly, the protector 10 tends to move laterally one way or the other relative to the chain 18. With sufficient lateral movement, the protector 10 would eventually come off the sprocket and the chain.

To prevent this lateral movement, I have developed a novel means 24 preferably integral with the body 12 of the protector 10. This lateral sliding preventive means 24 includes and defines a groove 44 in each flange portion 16. The grooves 44 are formed adjacent the web portion 14 and define on each flange 16 a shoulder member 46. The greater the deflection of the flanges 16 outwardly, the more defined and pronounced become the shoulder members 46 (FIG. 4). Lateral movement of the protector 10 will be prevented by the shoulders 46 which will abut against the sides of the chain 18 to prevent further lateral movement of the protector 10 relative to the chain. The grooves 44 and the shoulders 46, therefore, maintain proper guidance of the protector 10 on the chain 18 and on the sprockets. Lateral movement of the protector 10 relative to the chain 18 when the chain is intermediate the sprockets is, of course, prevented by the flanges 16 and the U-shaped construction of the protector 10. Additionally, the grooves 44 or any other relatively thin junction between the flanges 16 and the web 14 of the body 12 will permit bending of the flanges 16 principally about this junction rather than along the entire length of the flange.

I have shown and described, therefore, a resilient chain protector which provides cover protection for substantially the entire outer exposed surface of a link chain or the like and includes means for preventing lateral movement of the protector relative to the chain. Also, because of the U-shaped cross section of the protector 10, the protector at its lowermost point of travel can serve as a reservoir for a suitable lubricant for the chain. The lubricant, which may be oil or packed grease, for example, is added at this lowermost point of travel of the protector 10 and will remain substantially at this point relative to the system as the chain and protector move by.

Although I have described in some detail an exemplary embodiment of my invention, changes, modifications, and substitutions may be made therein without departing from the spirit of the invention. I therefore intend that my invention be limited in scope only by the terms of the following claims.

I claim:
1. A resilient chain protector for a link chain or the like, including:
   an elongated body with a generally U-shaped cross section having a web portion and opposed flange portions one extending from each side of said web portion, said body mountable about the chain with said web portion adjacent an outer face of the chain and said flange portions adjacent the sides of the chain; and
   means integral with said body for preventing lateral movement of said body relative to the chain with each of said flange portions including in its inside face a longitudinally grooved portion adjacent said web portion, said grooved portion defining a shoulder member of said flange portion, said means for preventing lateral movement including said shoulder members.

2. A chain protector as defined in claim 1 wherein each of said flange portions includes an elongated lip portion extending inwardly from the outer edge thereof, said lip portions being positionable adjacent the remaining face of the chain.

3. A chain protector as defined in claim 1 for use with a chain mountable between a plurality of sprockets, wherein said body is continuous.

4. A resilient chain protector for mounting about a link chain or the like connected between a number of sprockets, comprising:
   an elongated body member forming an endless loop, said body member having a generally U-shaped cross section and including a web portion joined to opposed flange portions at junctions, said junctions being substantially thinner than said flange portions, whereby the radius of the outer edge of each of said flange portions becomes less than the radius of said web portion as the chain engages a sprocket producing longitudinal compression at said flange outer edges urging said flange portions away from each other.

5. A chain protector as defined in claim 4 including means defining a shoulder member on the inside face of each of said flange portions adjacent said web portion.

6. A resilient chain protector for a link chain or the like, including:
   an elongated body with a generally U-shaped cross section having a web portion and opposed flange portions one extending from each side of said web portion,
   with the distance between said flange portions decreasing progressively from said web portion to the outer edges of said flange portions when said protector is in its natural state prior to mounting about the chain,
   with said body mountable about the chain with said web portion adjacent an outer face of the chain and said flange portions adjacent the sides of the chain; and
   means integral with said body for preventing lateral movement of said body relative to the chain.

References Cited

UNITED STATES PATENTS

| 612,564 | 10/1898 | Gilbert | 74—611 |
| 614,038 | 11/1898 | Toquet | 74—611 |
| 617,683 | 1/1899 | Farmer | 74—611 |
| 618,945 | 2/1899 | Myers | 74—611 |

FOREIGN PATENTS

| 7,953 | 10/1895 | England. |
| 25,190 | 10/1897 | England. |
| 179,633 | 9/1935 | Switzerland. |

FRED C. MATTERN, JR., Primary Examiner

F. D. SHOEMAKER, Assistant Examiner